(12) United States Patent
Onishi et al.

(10) Patent No.: US 8,233,131 B2
(45) Date of Patent: *Jul. 31, 2012

(54) LIQUID CRYSTAL DISPLAY DEVICE

(75) Inventors: Noriaki Onishi, Nara (JP); Naohisa Sonku, Nara (JP); Yusuke Tsuda, Kizugawa (JP); Hiroaki Kojima, Nara (JP); Yasunobu Tagusa, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/040,307

(22) Filed: Mar. 4, 2011

(65) Prior Publication Data

US 2011/0149199 A1  Jun. 23, 2011

Related U.S. Application Data

(63) Continuation of application No. 12/064,678, filed as application No. PCT/JP2006/314560 on Jul. 24, 2006, now Pat. No. 8,009,261.

(30) Foreign Application Priority Data

Sep. 22, 2005  (JP) ................................. 2005-276610

(51) Int. Cl.
  *G02F 1/1339* (2006.01)
(52) U.S. Cl. ....................................... 349/157; 349/156
(58) Field of Classification Search ........... 349/155–157
See application file for complete search history.

(56) References Cited

U.S. PATENT DOCUMENTS

| 6,067,144 | A | 5/2000 | Murouchi |
| 7,649,601 | B2 * | 1/2010 | Ikeda et al. .................... 349/129 |
| 8,009,261 | B2 * | 8/2011 | Onishi et al. .................. 349/155 |
| 2001/0026347 | A1 | 10/2001 | Sawasaki et al. |
| 2002/0149728 | A1 * | 10/2002 | Ogishima et al. ............. 349/129 |
| 2004/0070706 | A1 * | 4/2004 | Freeman ....................... 349/110 |
| 2005/0140914 | A1 | 6/2005 | Sawasaki et al. |
| 2005/0168674 | A1 | 8/2005 | Kubo |
| 2005/0237459 | A1 | 10/2005 | Ikeda et al. |

FOREIGN PATENT DOCUMENTS

| JP | 10-123534 A | 5/1998 |
| JP | 2001-201750 A | 7/2001 |
| JP | 2005-189662 A | 7/2005 |
| JP | 2005-250431 A | 9/2005 |
| JP | 2005-309239 A | 11/2005 |

OTHER PUBLICATIONS

Onishi et al.; "Liquid Crystal Display Device"; U.S. Appl. No. 12/064,678, filed Feb. 25, 2008.

* cited by examiner

*Primary Examiner* — Mark Robinson
*Assistant Examiner* — Charles Chang
(74) *Attorney, Agent, or Firm* — Keating & Bennett, LLP

(57) ABSTRACT

A liquid crystal display device includes a TFT substrate and a CF substrate arranged to face each other and a liquid crystal layer sandwiched therebetween, wherein a plurality of first supports are arranged to extend from one of the substrates to reach the other substrate and a plurality of second supports, which are shorter than the first supports, are arranged to extend from one of the substrates to the other substrate.

13 Claims, 9 Drawing Sheets

LIQUID CRYSTAL DISPLAY DEVICE

BACKGROUND OF THE INVENTION

1. Field of the Invention

The present invention relates to a liquid crystal display device.

2. Description of the Related Art

In recent years, liquid crystal display devices have widely been used as flat panel displays for communication tools. This is because the application of the liquid crystal display devices has rapidly been spread in the field of not only OA equipment but also mobile devices due to their enhanced definition, high display quality and increasing lightness and thinness. Under these circumstances, reduction in thickness and weight is still demanded in particular for liquid crystal display panels. A conventional pair of glass substrates of about 1.1 mm in thickness has now been replaced with a pair of glass substrates of about 0.7 mm in thickness. A pair of substrates of smaller thickness has also been considered.

Reduction of the thickness of the glass substrates of the liquid crystal display panel is accompanied by the following drawbacks.

If a pressure higher than a certain level is applied to the surface of the liquid crystal display panel, unevenness in display occurs (stain remains) in a display region. This phenomenon becomes remarkable as the substrate is thinned down. The thinner the substrate is, the more significantly a spacer near the surface which receives a point load is crushed. As a result, a gap between the substrates is reduced near the spacer to a further extent.

For specific explanation of this drawback, as shown in FIG. 14, a pair of glass substrates are arranged to face each other with a plurality of spacers interposed therebetween to leave a gap of 5 μm and a liquid crystal layer is disposed between the substrates. Then, a point load is applied to the middle of one of the substrates. One of the paired substrates is 0.5 mm in thickness, while the thickness of the other substrate is selected from 0.05, 0.1, 0.2, 0.3 and 0.5 mm. As indicated in FIG. 15, the thinner the glass substrate which receives the point load is, the more the glass substrate is warped. Further, as shown in FIG. 16, a 0.05 mm thick glass substrate is warped by 4 μm by a load of only about one-twenty of a load that warps a 0.5 mm thick glass substrate by 4 μm. This indicates that the thinning of the glass substrate easily causes the warpage of the substrate in response to even just a small load.

As a countermeasure against the warpage of the glass substrate, Japanese Unexamined Patent Publication No. 09-073093, discloses a liquid crystal display device including first and second substrates sandwiching liquid crystal therebetween. The first substrate carries a plurality of columnar spacers for leaving a gap between the first and second substrates and a first transparent electrode for applying a voltage to the liquid crystal. The second substrate carries a second transparent electrode for applying a voltage to the liquid crystal. The liquid crystal display device has a peripheral region which does not contribute to the display and a display region enclosed with the peripheral region. As a feature of the liquid crystal display device, the density of the columnar spacers formed on the peripheral region is higher than the density of those formed on the display region. Japanese Unexamined Patent Publication No. 09-073093 describes that this feature reduces display failure due to cell gap failure of the liquid crystal display device.

The technique of Japanese Unexamined Patent Publication No. 09-073093 is directed to restrain the warpage by increasing the number of the spacers to prevent the crush of the spacers and maintain the gap between the substrates. The problem of warpage may possibly be solved by this technique, but another problem of the occurrence of vacuum bubbles in a low temperature environment may arise (bubbles induced by shock at low temperature). At low temperature, the liquid crystal shows particularly significant volumetric shrinkage as compared with other components. Therefore, the spacers cannot follow the shrinkage of the liquid crystal layer and the vacuum bubbles are generated.

Solutions to the problem of the occurrence of bubbles caused by shock at low temperature have been proposed. For example, Japanese Unexamined Patent Publication No. 2002-341354 discloses a liquid crystal display element including liquid crystal sandwiched between two substrates opposing each other with a sealant arranged on the periphery thereof. First columnar spacers are formed on a light blocking region of at least one of the substrates to be in contact with the counter substrate, thereby determining a gap between the substrates. Second columnar spacers are also formed on the same region to have a clearance of 0.2 μm or less between their heads and the counter substrate. With this configuration, the bubbles are not formed by shock at low temperature and unevenness in display caused by a load applied in the production process or an external load is prevented from occurring.

Japanese Unexamined Patent Publication No. 2003-121857 discloses a color filter for a liquid crystal display device provided with columnar spacers including first columnar spacers and second columnar spacers. The first columnar spacers are configured to have a height and a cross-sectional area that make it possible to follow deformation caused by a load applied in a panel assembly process or shrinkage of liquid crystal in a low temperature environment. The second columnar spacers are configured to have a height and a cross-sectional area that make it possible to keep the gap between the substrates even if the liquid crystal is shrunk by a locally applied excessive load or in a low temperature environment. The columnar spacers are adapted to maintain the suitable gap between the substrates in the panel assembly process and are deformed when an excessive load is locally applied or the liquid crystal is shrunk in a low temperature environment, thereby keeping the gap between the substrates uniform. With this configuration, the panel assembly is carried out while keeping the suitable gap. Further, when the excessive load is locally applied or the liquid crystal is shrunk in the low temperature environment, the gap is reduced and kept uniform. Therefore, the liquid crystal display device is achieved without unevenness in color and vacuum bubbles (bubbles formed by shock at low temperature).

According to Japanese Unexamined Patent Publication No. 2002-341354 and Japanese Unexamined Patent Publication No. 2003-121857, a portion that follows the elastic deformation of the gap between the substrates is provided together with the first spacers for keeping the gap between the substrates to prevent the occurrence of bubbles caused by shock at low temperature. Further, the second spacers, which are shorter than the first supports, are provided in parallel with the first spacers. Since a thin liquid crystal display panel is less resistant against a local load and therefore greatly warped, a larger number of spacers must be provided. However, the increase of the first spacers for keeping the gap between the substrates raises the probability of occurrence of bubbles caused by shock at low temperature.

That is, it has been difficult to solve both of the problems involved in the thin liquid crystal display panel such as the warpage caused by the application of local load and the local occurrence of bubbles caused by shock at low temperature.

SUMMARY OF THE INVENTION

In order to solve the problems described above, preferred embodiments of the present invention provide a liquid crystal display device that prevents the occurrence of unevenness in display caused by a load applied generally or locally to the display region as well as the occurrence of bubbles induced by shock at low temperature.

A liquid crystal display device according to a preferred embodiment of the present invention includes a first substrate and a second substrate arranged to face each other and a liquid crystal layer sandwiched therebetween, wherein a plurality of first supports are arranged to extend from one of the first and second substrates to reach the other substrate and a plurality of second supports that are shorter than the first supports are arranged to extend from one of the first and second substrates to the other substrate.

With this configuration, the first supports are arranged to extend from one of the first and second substrates to reach the other substrate and the second supports that are shorter than the first supports are arranged to extend from one of the first and second substrates to the other substrate between the first and second substrates of the liquid crystal display device facing each other. Therefore, a load generally applied to the substrate is received by the first and second supports. With the provision of the second supports that are shorter than the first supports, the first and second substrates relatively move to follow the displacement of the liquid crystal layer. Accordingly, the occurrence of bubbles caused by shock at low temperature is prevented.

According to the liquid crystal display device of a preferred embodiment of the present invention, the number of the second supports may be larger than the number of the first supports.

With this configuration, the number of the first supports is minimized and the number of the second supports shorter than the first supports is increased. As a result, when a local load is applied, the first and second substrates follow the displacement of the liquid crystal layer with more flexibility. Therefore, the local occurrence of bubbles caused by shock at low temperature, which has been frequent in such a case, is prevented with high reliability.

According to the liquid crystal display device of a preferred embodiment of the present invention, the second supports may be provided in a display region.

If the second supports are provided in the display region, local display failure in the display region is prevented.

According to the liquid crystal display device of a preferred embodiment of the present invention, the number of the second supports provided in a unit pixel area of the display region may be larger than the number of first supports provided in the same area.

If the number of the second supports provided in the unit pixel area of the display region is larger than the number of the first supports in the same area, local display failure in the display region is prevented with high reliability.

According to the liquid crystal display device of a preferred embodiment of the present invention, the density of the second supports provided in the unit pixel area may be approximately 1.2 or more times the density of the first supports provided in the same area, for example.

The second supports according to a preferred embodiment of the present invention are adapted to prevent the occurrence of bubbles caused by shock at low temperature and to contribute to reduce the unevenness in display caused by pressure applied to the surface of the thinned substrate. From this point of view, the density of the second supports, which is determined by [(the number of the supports/mm$^2$)×the cross-sectional area of the supports], is preferably higher than that of the first supports. If the density of the second supports is approximately 1.2 or more times the density of the first supports, for example, the effect of the second supports is exhibited more significantly.

According to the liquid crystal display device of a preferred embodiment of the present invention, the second supports may be arranged in the same pattern in each of the unit pixel areas.

With this configuration, the second supports arranged in the uniform pattern equally receive the load applied locally to the substrate. As a result, the local substrate warpage is effectively prevented and the display function of the liquid crystal display device is made stable and is greatly improved.

According to the liquid crystal display device of a preferred embodiment of the present invention, a gap between the second supports and the opposing substrate may be about 0.05 or more times and about 0.2 or less times the thickness of the liquid crystal layer, for example.

If the gap between the second supports and the opposing substrate is about 0.2 or less times the thickness of the liquid crystal layer, the thin liquid crystal display device effectively prevents the unevenness in display caused by pressure applied to the liquid crystal display panel. Further, if the gap between the second supports and the counter substrate is about 0.05 or more times the thickness of the liquid crystal layer, the occurrence of bubbles caused by shock at low temperature and the occurrence of failed domains are prevented with high effectiveness and efficiency.

According to the liquid crystal display device of a preferred embodiment of the present invention, at least one of the first and second substrates may have a thickness of about 0.5 mm or less, for example.

With this configuration, in the case where the glass substrates have to be thinned down to reduce the thickness or the weight of the panel, the first and second substrates may be designed to have the same thickness or different thicknesses.

According to the liquid crystal display device of a preferred embodiment of the present invention, the first and second supports may have different thicknesses.

With this configuration, the first and second substrates, e.g., a TFT array substrate and a counter substrate, are relatively thinned down. This makes it possible to prevent the TFT array substrate whose thickness has been reduced to a size smaller than the predetermined level from breaking upon local application of heat or pressure to the periphery of the substrate in the process of directly mounting connection terminals and drivers on the TFT array substrate. Further, in the process of forming thin multilayers such as TFT terminals and wires, the TFT array substrate is affected or warped by changes in temperature or pressure. Even in such a case, the reduction of mechanical strength of the thinned TFT array substrate is prevented.

According to the liquid crystal display device of a preferred embodiment of the present invention, each of the unit pixel areas may include a light transmissive region and a light reflective region.

With this configuration, the first and second supports preferably are simultaneously formed in the light transmissive region and the light reflective region higher than the other region by the thickness of a reflective layer. That is, the first and second supports having different heights are provided efficiently. Therefore, production efficiency of the device is improved.

According to the liquid crystal display device of a preferred embodiment of the present invention, the second supports may be provided in a light blocking region of the display region.

If the second supports are provided in the light blocking region of the display region, leakage of light at the places of the second supports is prevented. Further, if the second supports are provided in the light blocking region in the light reflective region of the pixel, such as a storage capacitor line, the reduction of effective aperture ratio is prevented.

According to the liquid crystal display device of a preferred embodiment of the present invention, the first and second supports may have different cross-sectional areas.

In general, the larger the cross-sectional area of the supports (an area of a cross section taken in the direction perpendicular to the direction of extension of the supports) is, the higher resistance to pressure the glass substrate is likely to have. The supports prevent leakage of light if they are formed at certain positions on the lines. On the other hand, if the supports are designed to have a larger cross-sectional area than the certain level, the display characteristics such as contrast ratio are adversely affected. In particular, in the case of a preferred embodiment of the present invention where a larger number of the second supports than the first supports are provided, the first and second supports having different cross-sectional areas are arranged in asymmetric patterns. Therefore, the reduction of aperture ratio and contrast ratio of the panel is effectively prevented. The first and second supports may be made of the same or different materials in the different processes. However, it is more effective to form the first and second supports at one time by the same photolithography and patterning from the viewpoints of reduction of production process and cost. In this way, the first and second supports may be formed at one time to have different heights and different cross-sectional areas.

According to the liquid crystal display device of a preferred embodiment of the present invention, the cross-sectional area of the second supports may be smaller than the cross-sectional area of the first supports.

If the cross-sectional area of the second supports to be formed at certain positions and certain density with respect to the first supports is designed to be smaller than the cross-sectional area of the first supports, the second supports are provided by the steps of the same number as the conventional steps of providing the first supports for keeping the gap between the substrates.

According to the liquid crystal display device of a preferred embodiment of the present invention, vertical alignment films for vertically aligning liquid crystal molecules when no voltage is applied may be provided on the surfaces of the first and second substrates facing the liquid crystal layer, respectively, and alignment controllers for radially aligning the liquid crystal molecules when a voltage is applied may be provided on at least one of the surfaces of the first and second substrates facing the liquid crystal layer.

With this configuration, in the liquid crystal layer sandwiched between the substrates that are less likely to cause local warpage, the vertical alignment under no application of load and the radial alignment under application of load are not disturbed even if a local load is applied. Therefore, excellent display quality is maintained.

According to the liquid crystal display device of a preferred embodiment of the present invention, the second supports may also function as the alignment controllers.

If the second supports also function as the alignment controllers, the required number of the second supports is reduced. Therefore, the production efficiency of the device is improved.

According to the liquid crystal display device of a preferred embodiment of the present invention, an alignment film subjected to a certain alignment treatment may be provided on at least one of the surfaces of the first and second substrates facing the liquid crystal layer.

With this configuration, in the liquid crystal layer sandwiched between the substrates that are less likely to cause local warpage, the alignment given by the certain alignment treatment is not disturbed even if a local load is applied. Therefore, excellent display quality is maintained.

According to various preferred embodiments of the present invention, as described above, a liquid crystal display device is obtained which prevents the unevenness in display and the occurrence of bubbles caused by shock at low temperature even if a load is applied entirely or locally to the display region.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, liquid crystal display devices according to first and second preferred embodiments will be explained in detail with reference to the drawings. The preferred embodiments are not intended to limit the present invention.

First and second preferred embodiments of the present invention are directed to a thin liquid crystal display device used for mobile equipment such as mobile phones.

First Preferred Embodiment

Structure of Liquid Crystal Display Device 10

Figure 1:
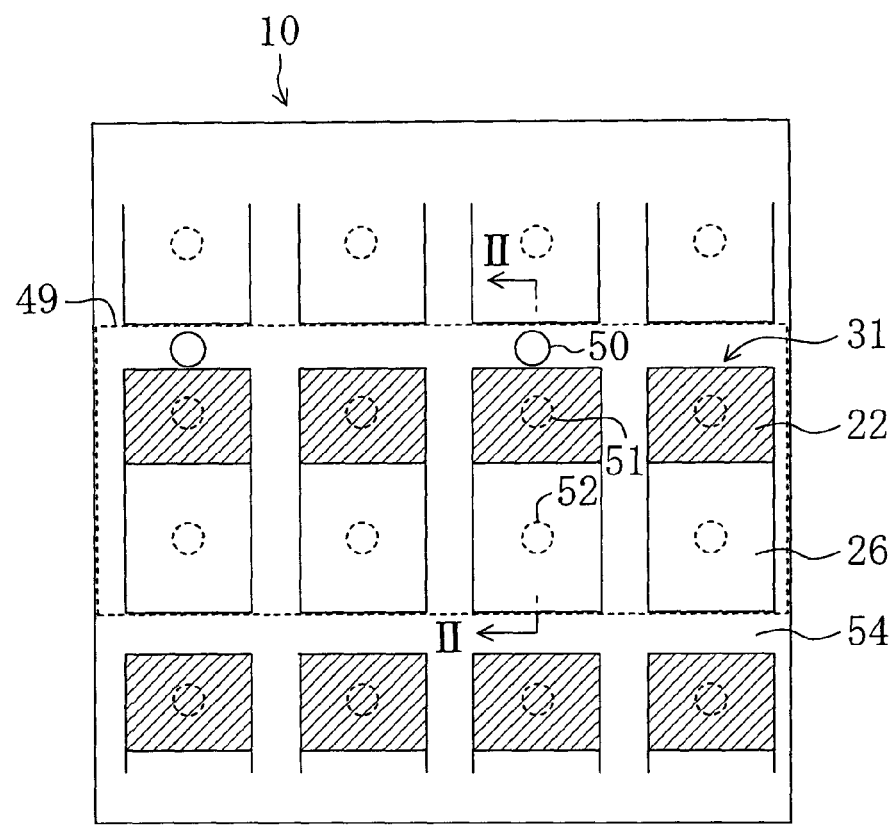
FIG. 1 is a plan view of a liquid crystal display device according to first preferred embodiment of the present invention.
Figure 2:
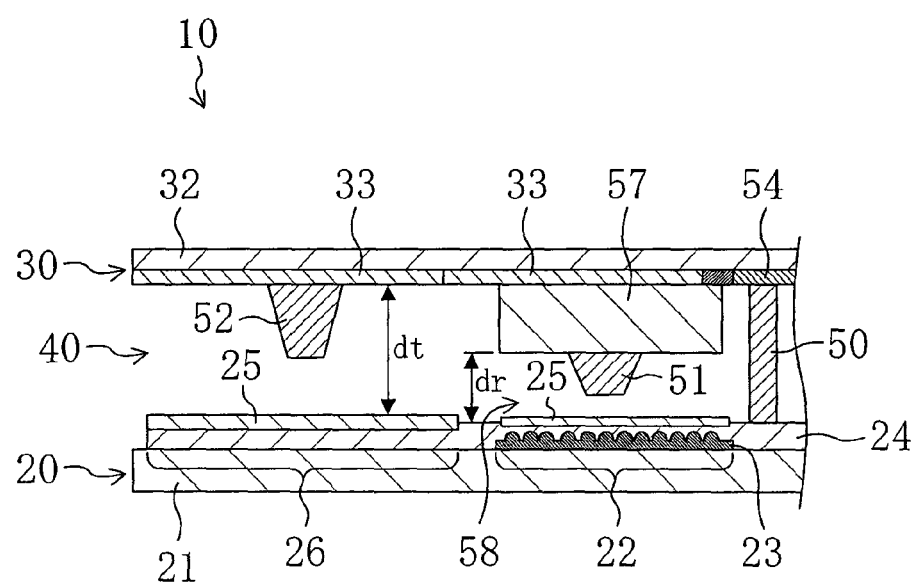
FIG. 2 is a sectional view of the liquid crystal display device taken along the line II-II of FIG. 1.

FIG. 1 is a plan view illustrating a display surface of a liquid crystal display device 10 and FIG. 2 is a sectional view of the liquid crystal display device 10 taken along a broken line II-II shown in FIG. 1. The liquid crystal display device 10 preferably is a semi-transmissive liquid crystal display device that allows display in both of a transmissive mode and a reflective mode.

The liquid crystal display device 10 includes a TFT substrate 20 and a color filter substrate (CF substrate) 30 arranged to face each other, a liquid crystal layer 40 provided between the substrates and first supports 50, second supports 51 and alignment controllers 52 provided between the opposing substrates 20 and 30.

The TFT substrate 20 includes a glass substrate 21 provided with active elements (not shown) formed on the surface thereof and circuit elements (not shown) such as gate lines and source lines connected to the active elements. A reflective layer 23 having a corrugated surface is formed on a reflective region 22 of a pixel region of the TFT substrate 20 and a transparent insulating layer 24 is formed to cover the reflective layer 23 and planarize the corrugated surface of the reflective layer 23. On the flat surface of the transparent insulating layer 24, transparent pixel electrodes (not shown) and a vertical alignment film 25 are formed in this order.

The pixel electrodes are divided in the form of a plurality of subpixels 31 as shown in FIG. 1 by a cutout portion (not shown) of a predetermined pattern. When a certain voltage is applied to the liquid crystal layer 40, an oblique electric field is generated around the pixel electrode or near the cutout portion and radially aligned liquid crystal domains are formed in the subpixels 31, respectively. As shown in FIG. 1, a unit of four parallel subpixels 31 partitioned by a black matrix 54 described later is referred to as a pixel pattern 49 (unit pixel area). In the present preferred embodiment, a set of four parallel subpixels 31 partitioned by the black matrix 54 is regarded as the pixel pattern 49. However, the number and the arrangement of the subpixels 31 of the pixel pattern 49 may be varied depending on the type of the display device.

The CF substrate 30 includes a glass substrate 32 thinner than the glass substrate 21 of the TFT substrate 20. A CF layer including red (R), green (G) and blue (B) subpixels 31 and a vertical alignment film 33 are formed on the thin glass substrate 32 in this order. Each of the subpixels 31 is rimmed with a black matrix 54 for obtaining contrast. That is, the black matrix 54 separates the subpixels 31. The R, G and B subpixels 31 may be replaced with those of complementary colors, i.e., cyan, magenta and yellow.

The thickness of the glass substrate 32 of the CF substrate 30 and the thickness of the glass substrate 21 of the TFT substrate 20 are not particularly limited. The glass substrate of the TFT substrate 20 may be thinner than that of the CF substrate 30 or they may have the same thickness.

Each of the first supports 50 is formed to extend from the TFT substrate 20 to reach the CF substrate 30. The first support 50 is formed on the black matrix 54 of the CF substrate 30. The first support 50 is adapted to keep the thickness of the liquid crystal layer 40, i.e., its height defines the thickness of the liquid crystal layer 40. The shape of the first support 50 is not particularly limited. For example, it may be shaped in the form of a cylinder, a prism, a tapered cylinder or a tapered prism. The first support 50 of the present preferred embodiment is preferably made of a resin material. However, the material for the first support is not particularly limited as long as it is resistant to pressure applied to the substrate. For example, the first support may be made of ceramic or metal.

Figure 3:
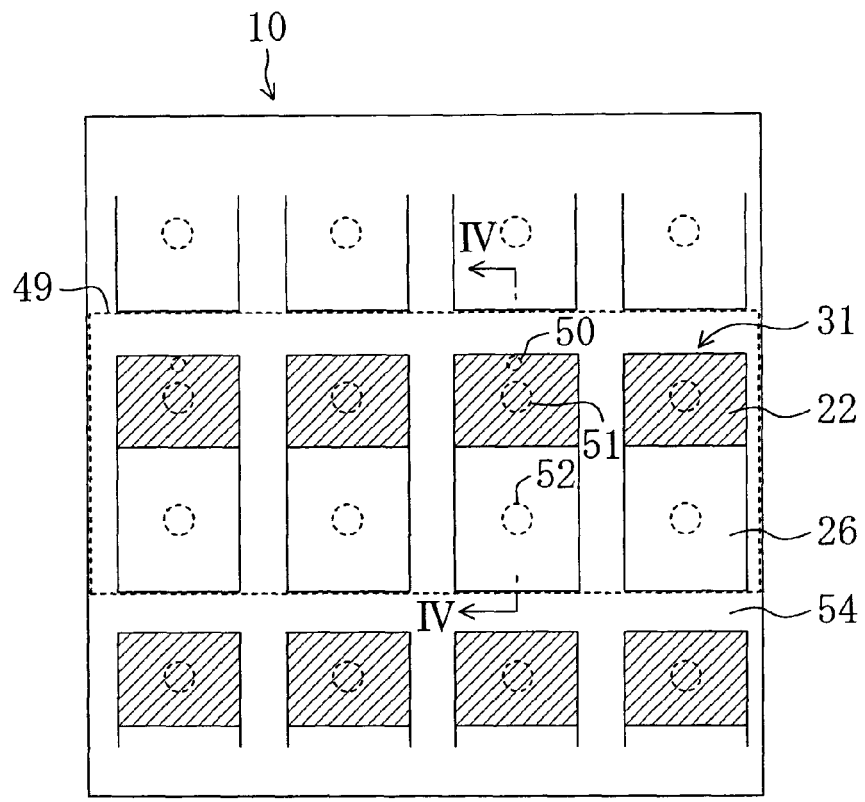
FIG. 3 is a plan view of the liquid crystal display device with first supports formed in reflective regions.
Figure 4:
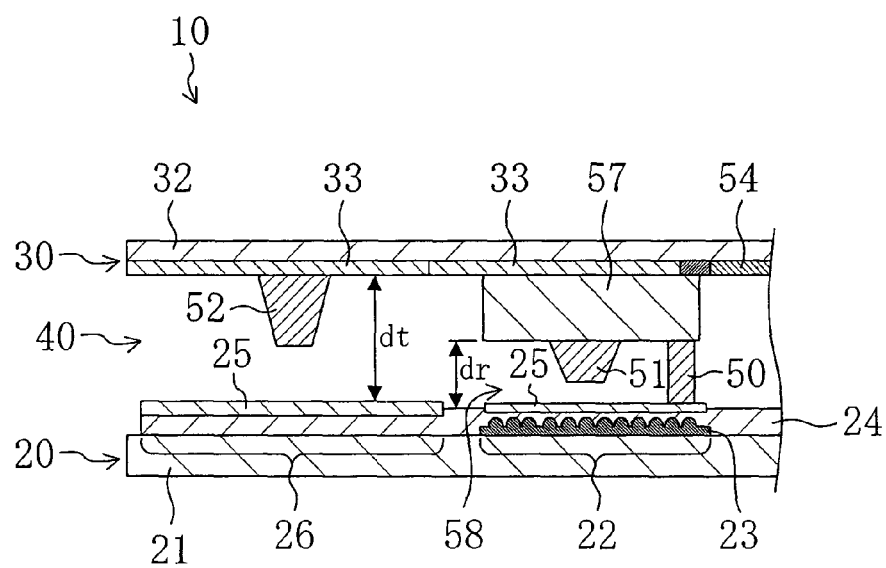
FIG. 4 is a sectional view of the liquid crystal display device taken along the line IV-IV of FIG. 3.

Unlike the present preferred embodiment, the first support 50 may be formed on other light blocking region than the black matrix 54 (e.g., on a storage capacitor line in the display region). As shown in FIGS. 3 and 4, the first support 50 may be formed on a transparent dielectric layer 57. Also in this case, the first support 50 is formed to extend from the transparent dielectric layer 57 to reach the TFT substrate 20.

The alignment controller 52 is formed on a portion of the CF substrate 30 in a transmissive region 26. The alignment controller 52 is formed on the surface of the vertical alignment film 33 facing the liquid crystal layer 40 and shaped into a truncated cone extending toward the TFT substrate 20. The alignment controller 52 is formed in each of the subpixels 31 such that the alignment is stabilized in each of the subpixels 31.

The transparent dielectric layer 57 is formed on a portion of the CF substrate 30 in a reflective region 22. The transparent dielectric layer 57 has a certain thickness and is formed on the surface of the vertical alignment film 33 facing the liquid crystal layer 40. The thickness of the transparent dielectric layer 57 is preferably almost half the thickness dt of the liquid crystal layer 40. In a reflective display mode, light used for the display passes the liquid crystal layer 40 twice. In the transmissive mode, on the other hand, light used for the display passes the liquid crystal layer 40 only once. Therefore, excellent display is achieved in both of the display modes if the thickness dt of part of the liquid crystal layer 40 in the transmissive region 26 is preferably about twice the thickness dr of part of the liquid crystal layer 40 in the transmissive region 22.

Each of the second supports 51 is formed on the transparent dielectric layer 57 formed on a portion of the CF substrate 30 in the reflective region 22. Therefore, the first and second supports having different heights can simultaneously be formed with efficiency in the transmissive region 26 and the reflective region 22 higher than the other region due to the presence of the reflective layer 23. The second support 51 of the present preferred embodiment is preferably made of a resin material. However, the material for the second support is not particularly limited as long as it is resistant against pressure applied to the substrate. For example, the second support may be made of ceramic or metal. The second support 51 preferably is in the form of a truncated cone extending toward the TFT substrate 20 and a gap 58 is provided between the head of the second support and the TFT substrate 20. Therefore, a load applied to the substrate is received by the first and second supports 50 and 51. Since the second supports are preferably shorter than the first supports 50 and the gap 58 is generated between the heads of the second supports 51 and the TFT substrate 20, the substrates 20 and 30 are relatively moved to follow the displacement of the liquid crystal layer 40. As a result, the occurrence of bubbles induced by shock at low temperature is prevented.

If the gap 58, i.e., a clearance between the head of the second support 51 and the opposing TFT substrate 20, is about 0.2 or less times the thickness of the liquid crystal layer 40, for example, unevenness in display caused by pressure applied to a liquid crystal display panel of a thin liquid crystal display device is prevented in an effective manner. Further, if the clearance between the head of the second support 51 and the opposing TFT substrate 20 is about 0.05 or more times the thickness of the liquid crystal layer 40, for example, the occurrence of bubbles caused by shock at low temperature and the occurrence of failed domains are effectively prevented.

Since the second support 51 is formed in the display region, display failure is prevented from occurring locally in the display region. However, the second support 51 may be formed in other region than the display region, e.g., on the black matrix 54. The second support 51 may also be formed on a light blocking region in the display region such that leakage of light at the location of the second support 51 is prevented. If the second support is formed on the light blocking region such as a storage capacity line in the reflective region 22, the effective aperture ratio is less likely to decrease.

The second support 51 is provided in each of the subpixels 31. Therefore, the number of the second supports 51 is larger than the number of the first supports 50 formed on the black matrix 54 in correspondence with every other subpixel 31. With this configuration, the number of the first supports 50 is minimized and the number of the second supports 51 shorter than the first supports 50 is increased. As a result, when a local load is applied, the substrates 20 and 30 are allowed to follow the displacement of the liquid crystal layer 40 with more flexibility. Therefore, the local occurrence of bubbles caused by shock at low temperature that has been frequent in such a case is prevented with high reliability. The second supports 51 preferably are arranged in the same pattern in each of the subpixels 31. To be more specific, as shown in FIG. 1, every second support 51 is provided on the transparent dielectric layer 57 to be positioned substantially in the middle of the reflective region 22 in the subpixel 31. Therefore, when a local load is applied to the substrate, the uniformly aligned second supports 51 equally receive the load. As a result, local warpage of the substrate is effectively prevented and the display function of the liquid crystal display device 10 is stabilized and improved to a higher degree.

The arrangement of the second supports 51 is not limited. The density of the second supports 51 may be about 1.2 or more times the density of the first supports 50. The second supports 51 of the present preferred embodiment make it possible to prevent the occurrence of bubbles induced by shock at low temperature and contribute to reduce unevenness in display caused by pressure applied to the substrate of reduced thickness. From this aspect, the density of the second supports, which is determined by [(the number of the supports/mm$^2$)×the cross-sectional area of the supports], is preferably higher than the density of the first supports, more preferably about 1.2 or more times the density of the first supports to exhibit the above-described effects to a higher degree.

According to the present preferred embodiment, the supports are arranged such that the density of the second supports 51 is about 1.2 or more times the density of the first supports 50. For example, one or more first supports 50 and 51 are preferably provided in a display unit, i.e., a picture element (consists of a set of R, G and B pixels). From the aspect of preventing the occurrence of bubbles caused by shock at low temperature, it is difficult to provide three or more first supports 50 for keeping the gap to be filled with the liquid crystal in a single picture element. If the first support 50 is subjected to an alignment treatment such as rubbing, the alignment may be disturbed near the support and display quality may possibly be decreased, e.g., light leakage may occur. Therefore, for example, it is preferable to provide the first support adjacent to the B (blue) pixel having relatively low luminosity. In particular, in a normally black mode liquid crystal display device which makes use of vertical alignment just like the device of the present preferred embodiment, it is also effective to provide the second support not only on a certain signal line outside the effective display region but also in a portion of the display region in substantially the middle of an alignment axis, for example.

Each of the second supports 51 makes use of its shape to stabilize the alignment of the liquid crystal layer 40 in each of the subpixels 31. The center of the alignment is fixed to substantially the middle of the reflective region 22 of the subpixel 31 such that the liquid crystal molecules aligned in the radial directions are almost uniformly dispersed. Thus, uniform display is achieved. In this way, the second support 51 also serves as an alignment controller in the reflective region 22. Therefore, the number of required second supports 51 or alignment controllers is reduced and the production efficiency of the device is improved.

In the present preferred embodiment, the first and second supports 50 and 51 are formed on the CF substrate 30. However, they may be formed on the TFT substrate 20 or separately formed on different substrates.

Second Preferred Embodiment

Structure of Liquid Crystal Display Device 60

A liquid crystal display device 60 according to a second preferred embodiment of the present invention will be explained with reference to the drawings.

Figure 5:
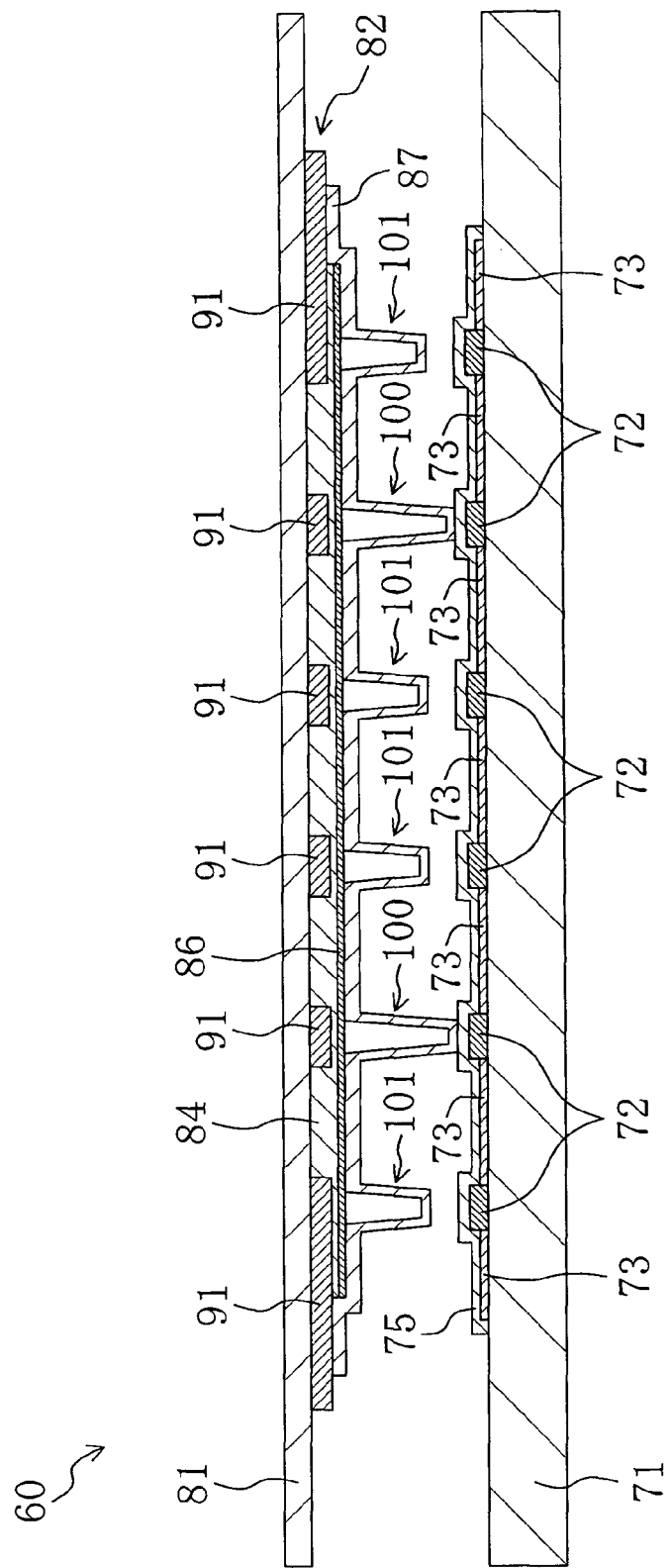
FIG. 5 is a sectional view of a liquid crystal display device according to a second preferred embodiment of the present invention.

FIG. 5 shows the liquid crystal display device 60. The liquid crystal display device 60 preferably is a twisted nematic (TN) liquid crystal display device in which the opposing substrates have been subjected to an alignment treatment, respectively.

The liquid crystal display device 60 includes a TFT substrate 70 and a color filter substrate (CF substrate) 80 arranged to face each other, a liquid crystal layer 90 sandwiched therebetween and first supports 100 and second supports 101 arranged between the opposing substrates 70 and 80.

The TFT substrate 70 includes a glass substrate 71, switching elements 72 including signal lines and scanning lines formed on the glass substrate 71 and pixel electrodes 73. An alignment film 75 is formed to cover their surfaces facing the liquid crystal layer 90. The alignment film 75 has been subjected to an alignment treatment.

Figure 6:
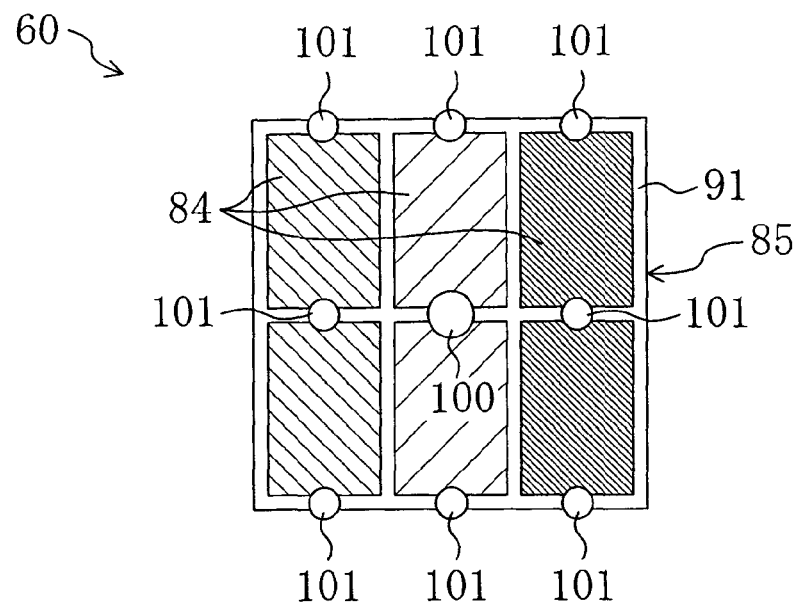
FIG. 6 is a plan view of a pixel pattern of the liquid crystal display device.

The CF substrate 80 includes a glass substrate 81 thinner than the glass substrate 71 of the TFT substrate 70 and a CF layer 82 including red (R), green (G) and blue (B) subpixels 84 formed on the glass substrate 81. Each of the subpixels 84 is rimmed with a black matrix 91 for obtaining contrast. That is, the black matrix 91 separates the subpixels 84 as shown in FIG. 6. The R, G and B subpixels 84 may be replaced with those of complementary colors, i.e., cyan, magenta and yellow. As shown in FIG. 6, in the CF layer 82, a unit pixel area including six subpixels 84 arranged in a 2×3 matrix pattern is referred to as a pixel pattern 85. The pixel pattern 85 is varied depending on the size of the liquid crystal display device 60. For example, the pixel pattern 85 including six subpixels 84 according to the present preferred embodiment may be replaced with a pixel pattern including nine subpixels arranged in a 3×3 matrix pattern.

The CF substrate 80 further carries a transparent electrode 86 on the surface of the CF layer 82 facing the liquid crystal layer 90. An alignment film 87 having a surface that has gone through an alignment treatment is formed on the surface of the transparent electrode 86 facing the liquid crystal layer 90. The alignment film 87 has been subjected to an alignment treatment such that it has an alignment direction perpendicular to the alignment direction given to the alignment film 75 formed on the TFT substrate 70.

The thickness of the glass substrate 81 of the TFT substrate 80 and the thickness of the glass substrate 71 of the TFT substrate 70 are not particularly limited. The glass substrate of the TFT substrate 70 may be thinner than that of the CF substrate 80 or they may have the same thickness.

Each of the first supports 100 is formed to extend from the TFT substrate 70 to reach the CF substrate 80. The first support 100 is formed on the black matrix 91 of the CF substrate 80. The first support 100 is adapted to keep the thickness of the liquid crystal layer 90, i.e., its height defines the thickness of the liquid crystal layer 90. The shape of the first support 100 is not particularly limited. For example, it may be shaped in the form of a cylinder, a prism, a tapered cylinder or a tapered prism. The first support 100 of the present preferred embodiment is preferably made of a resin material. However, the material for the first support is not particularly limited as long as it is resistant to pressure applied to the substrate. For example, the first support may be made of ceramic or metal.

Unlike the present preferred embodiment, the first support 100 may be formed on other light blocking region than the black matrix 91 (e.g., on a storage capacitor line in the display region).

Each of the second supports 101 is formed on the black matrix 91 of the CF layer 82. The second support 101 preferably has a truncated cone shape extending toward the opposing TFT substrate 70 and a gap 58 is generated between the head of the second support and the TFT substrate 70. Therefore, when a load is applied to the substrate, the first and second supports 100 and 101 bear the load. Since the second support is shorter than the first support 100 and the gap 58 is formed between the head of the second support 101 and the TFT substrate 70, the substrates 70 and 80 are relatively moved to follow the displacement of the liquid crystal layer 90. As a result, the occurrence of bubbles induced by shock at low temperature is prevented.

If the gap 58, i.e., a clearance between the head of the second support 101 and the opposing TFT substrate 70, is about 0.2 or less times the thickness of the liquid crystal layer 90, unevenness in display caused by pressure applied to a liquid crystal display panel of a thin liquid crystal display device is prevented in an effective manner. Further, if the clearance between the head of the second support 101 and the opposing TFT substrate 70 is about 0.05 or more times the thickness of the liquid crystal layer 90, the occurrence of bubbles caused by shock at low temperature and the occurrence of failed domains are efficiently prevented.

The second support 101 of the present preferred embodiment is preferably made of a resin material. However, the material for the second support is not particularly limited as long as it is resistant to pressure applied to the substrate. For example, the second support may be made of ceramic or metal.

As shown in FIG. 6, eight second supports 101, for example, are preferably arranged on the black matrix 91 dividing the subpixels 84 in a uniform pattern with the first support 100 as the center of them. That is, the number of the second supports 101 is preferably larger than the number of the first supports 100. In this way, the number of the first supports 100 is minimized and the number of the second supports 101 shorter than the first supports is increased such that the substrates 70 and 80 are allowed to follow the displacement of the liquid crystal layer 90 with more flexibility when a local load is applied. Therefore, the local occurrence of bubbles caused by shock at low temperature that has been frequent in such a case is prevented with high reliability. The second supports 101 are preferably arranged in the same pattern in each of the pixel patterns 85. To be more specific, just like the eight second supports 101 arranged in the pixel pattern 85 including six subpixels 84 shown in FIG. 6, eight second supports are arranged to surround the first support 100 in the other pixel patterns 85 of the liquid crystal display device 60. Therefore, a local load applied to the substrate is equally received by the second supports 101 arranged in a uniform pattern. As a result, local warpage of the substrate is effectively prevented and the display function of the liquid crystal display device 60 is stabilized and improved to a higher degree.

Figure 7:
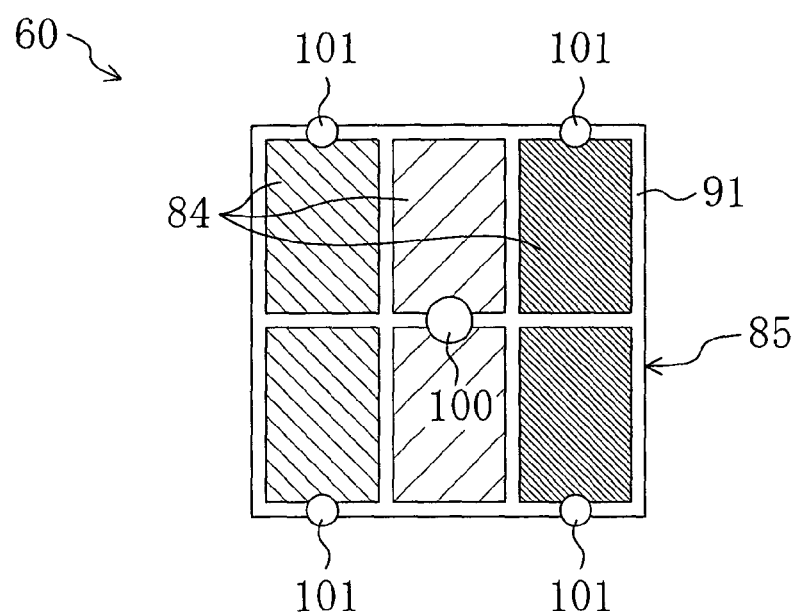
FIG. 7 is a plan view of the pixel pattern of the liquid crystal display device in which second supports are arranged on diagonal lines intersecting at a first support as the center.
Figure 8:
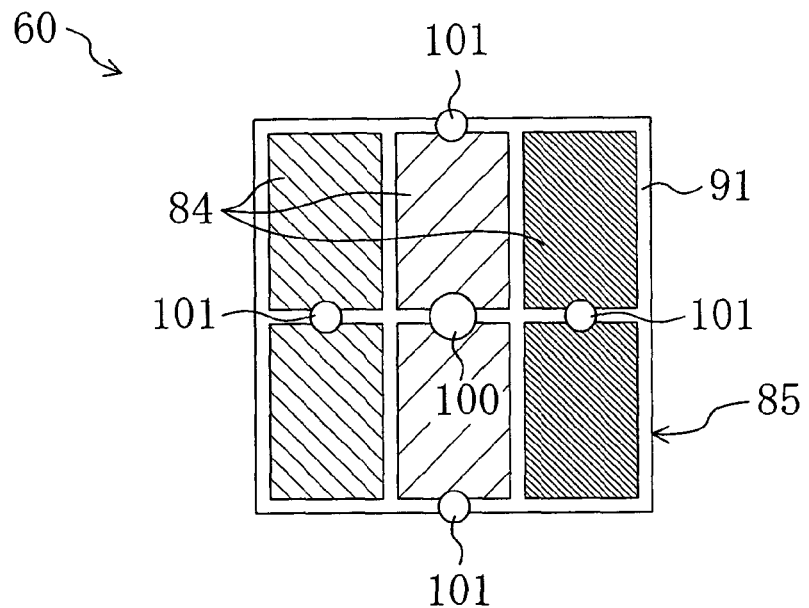
FIG. 8 is a plan view of the pixel pattern of the liquid crystal display device in which the second supports are arranged on lines extending laterally and longitudinally from the first support as the center.
Figure 9:
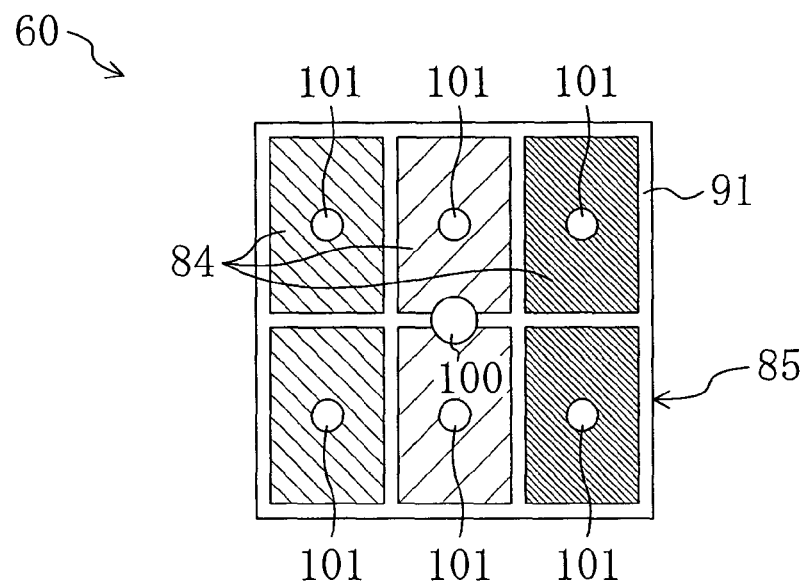
FIG. 9 is a plan view of the pixel pattern of the liquid crystal display device in which the second supports are arranged in subpixels, respectively.

The arrangement of the second supports 101 is not limited to the above. As shown in FIG. 7, four second supports may be arranged on four portions of the black matrix 91 in the pixel pattern 85 corresponding to diagonal lines intersecting at the first support 100. As shown in FIG. 8, four second supports may be arranged on four portions of the black matrix 91 in the pixel pattern 85 corresponding to lines extending longitudinally and laterally from the first support 100. Further, as shown in FIG. 9, six second supports may be arranged on storage capacity lines (not shown) positioned in the middle of the subpixels 84, respectively.

The density of the second supports 101 may be about 1.2 or more times the density of the first supports 100. The second supports 101 of the present preferred embodiment make it possible to prevent the occurrence of bubbles induced by shock at low temperature and contribute to reduce unevenness in display caused by pressure applied to the substrate of reduced thickness. From this aspect, the density of the second supports, which is determined by [(the number of supports/$mm^2$)×the cross-sectional area of the supports], is preferably higher than that of the first supports, more preferably about 1.2 or more times the density of the first supports to exhibit the above-described effects to a higher degree.

According to the present preferred embodiment, the supports are arranged such that the density of the second supports 101 is about 1.2 or more times the density of the first supports 100. For example, as shown in FIGS. 6 to 9, one or more first and second supports 100 and 101 are preferably provided in a display unit, i.e., a picture element (consists of a set of R, G, and B pixels). From the aspect of preventing the occurrence of bubbles caused by shock at low temperature, it is difficult to provide three or more first supports 100 for keeping the gap to be filled with the liquid crystal in a single picture element. If the first support 100 is subjected to an alignment treatment such as rubbing, the alignment may be disturbed near the support and display quality may possibly be decreased, e.g., light leakage may occur. Therefore, for example, it is preferable to provide the first support adjacent to the B (blue) pixel having relatively low luminosity.

In the present preferred embodiment, the first and second supports 100 and 101 are formed on the CF substrate 80. However, they may be formed on the TFT substrate 70 or separately formed on different substrates.

The present preferred embodiment is preferably directed to the TN liquid crystal display device 60. However, it is not limitative and a super twisted nematic liquid crystal display device or an electrically controlled birefringence (ECB) liquid crystal display device may be used as the liquid crystal display device 60.

In the first and second preferred embodiments, it is particularly effective to provide the supports at certain locations in the panel by photolithography. The supports may be made of material which shows excellent resolution and development properties in the patterning process and is mechanically strong, less polluting and highly transparent to liquid crystal.

To be more specific, a negative photosensitive material which cures as it is exposed to light and a positive photosensitive material in which a bond is released by exposure to light and selective dissolution proceeds in the development process are available. For example, from the viewpoint of maintaining transparency and mechanical strength, a photosensitive resin based on acrylate, urethane acrylate, epoxy acrylate or methacrylate is preferably used for the patterning.

EXAMPLES

Inspection of the liquid crystal display devices according to preferred embodiments of the present invention was made to examine the influence of various loads on display function of the devices.

Evaluation Test 1

An evaluation test was performed on liquid crystal display devices configured according to the first preferred embodiment to examine the relationship among the thicknesses of the substrates, the densities of the first and second supports and unevenness in display due to load applied to the display device.

Liquid Crystal Display Device for Evaluation Test

Liquid crystal display devices were prepared each including a combination of a 0.5 mm thick first substrate and a 0.05 mm thick second substrate or a combination of a 0.5 mm first substrate and a 0.1 mm thick second substrate and first and second supports each arranged at a predetermined density (pieces per unit area) and having a predetermined cross-sectional area (diameter). A pair of certain polarizers were bonded to the outer surfaces of the substrates of the liquid crystal display panel.

Evaluation Method

For evaluation of unevenness in display caused by pressure, a load application test was performed on the liquid crystal display devices for evaluation using Instron Universal Testing Machine model 5543.

First, the liquid crystal display device was placed on a cylindrical table with the CF substrate facing upward.

Figure 11:
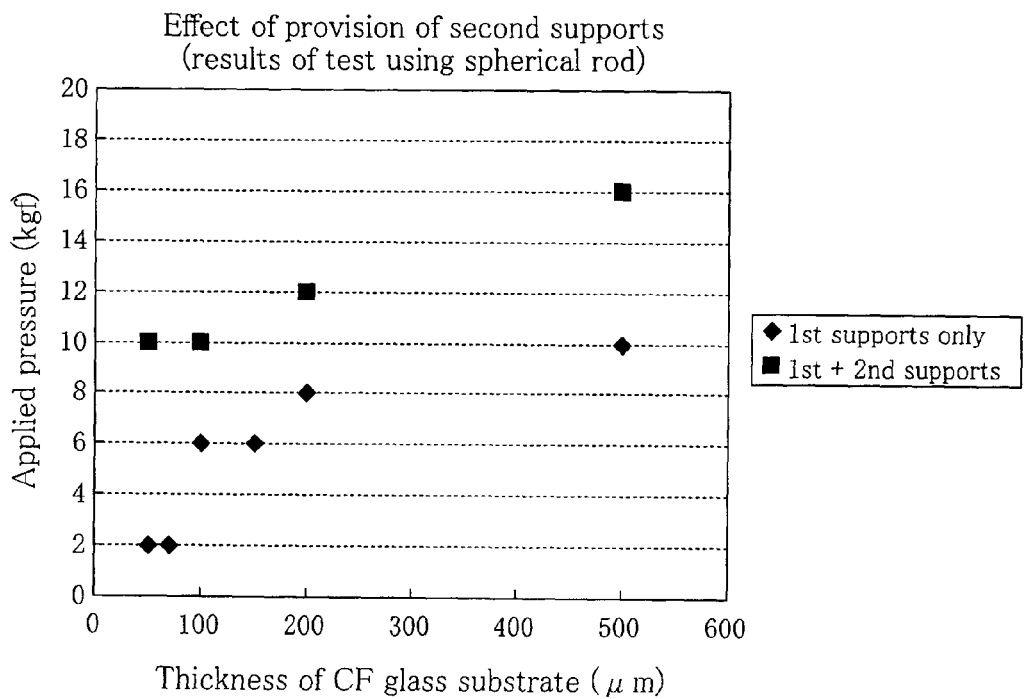
FIG. 11 is a graph illustrating the relationship between the thickness of a CF glass substrate and the upper limit value of applied pressure that does not cause unevenness in display when the density of the first supports is fixed (about 25 pieces/mm$^2$, diameter: about 12 μm).

Then, a load was applied to the surface of the CF substrate of the liquid crystal display device at the rate of 1 mm/min using a cylindrical pressing jig as shown in FIG. 11. Three kinds of cylindrical pressing jigs of the Instron Universal Testing Machine were used for the test.

Cylindrical rubber jig: a 10 mm diameter brass rod with a rubber film attached to the end (means to apply most ideal surface load)

Cylindrical jig: a 10 mm diameter brass rod without a rubber film at the end (means to simulate the case where the display device is likely to be damaged by a local load which is often applied in a durability test for a display device assembled into a cell phone)

Spherical jig: a 10 mm diameter brass rod with a spherical end (R5) not covered with a rubber film (means to simulate the case where the display is likely to be damaged by a load applied to a smaller area, e.g., the case where a load is applied by something pointed or the case where a cell-phone strap or the like is sandwiched in a clamshell phone)

When the pressing load was increased up to a predetermined value, the cylindrical pressing jig of the Instron Universal Testing Machine was maintained for 5 seconds. Then, the load on the substrate was withdrawn at the rate of 1 mm/min.

In this manner, the load application test was carried out at several portions of the substrate surface.

After a lapse of 5 minutes from the load application test, the liquid crystal display devices showing a white image and a halftone image on the entire screen were visually checked in the direction perpendicular to the panel (substrate) surface and in directions tilted about 45° from the perpendicular direction as to the presence of unevenness and the degree of the unevenness, if any.

Evaluation Results

Table 1 shows the results of the load application test for examining the unevenness in display caused by pressure. In Table 1, symbol ⊚ indicates that excellent results were obtained in all the tests using the cylindrical rubber jig, the cylindrical jig and the spherical jig. Likewise, symbol ○ indicates that the results of two of the tests were excellent, symbol Δ indicates that the results of one of the tests were excellent and symbol x indicates that excellent results were not obtained in all the tests.

TABLE 1

| Structure of 1st support | Density | Piece/mm² | 25 | 25 | 25 | 25 | 25 | 25 | 25 | 50 | 75 |
|---|---|---|---|---|---|---|---|---|---|---|---|
| | | Multiple | 1 | 1 | 1 | 1 | 1 | 1 | 1 | 2 | 3 |
| | Area | Diameter (μm) | 12 | 17 | 21 | 24 | 12 | 17 | 12 | 12 | 12 |
| | | Multiple | 1 | 2 | 3 | 4 | 1 | 2 | 1 | 1 | 1 |
| Structure of 2nd support | Density | Piece/mm² | 125 | 125 | 125 | 125 | 50 | 100 | 125 | 100 | 75 |
| | | Multiple | 5 | 5 | 5 | 5 | 2 | 4 | 5 | 4 | 3 |
| | Area | Diameter (μm) | 6 | 6 | 6 | 6 | 6 | 6 | 12 | 6 | 6 |
| | | Multiple | 0.5 | 0.5 | 0.5 | 0.5 | 0.5 | 0.5 | 1 | 0.5 | 0.5 |
| Ratio of density of support (2nd/1st) | | | 2.5 | 1.25 | 0.83 | 0.63 | 1 | 1 | 5 | 1 | 0.5 |
| Substrate thickness (1st/2nd) (mm) | | | | | | | 0.5/0.05 | | | | |

TABLE 1-continued

| | | | | | | | | | | | |
|---|---|---|---|---|---|---|---|---|---|---|---|
| Pressure test for examining unevenness in display/Load capacity: kgf(N) | (1) Cylindrical rubber jig | Result (kgf) | 16 | 28 | 40 | 50 | 11 | 18 | 18 | 20 | 25 |
| | | Result (N) | 157 | 274 | 392 | 490 | 108 | 176 | 176 | 196 | 245 |
| | | Judgment | ○ | ○ | ○ | ○ | X | ○ | ○ | ○ | ○ |
| | (2) Cylindrical jig | Result (kgf) | 10 | 16 | 20 | 24 | 7 | 9 | 13 | 15 | 18 |
| | | Result (N) | 98 | 157 | 196 | 235 | 69 | 88 | 127 | 147 | 176 |
| | | Judgment | ○ | ○ | ○ | ○ | X | X | ○ | ○ | ○ |
| | (3) Spherical jig | Result (kgf) | 10 | 16 | 18 | 20 | 6 | 7 | 12 | 14 | 17 |
| | | Result (N) | 98 | 157 | 176 | 196 | 59 | 69 | 118 | 137 | 167 |
| | | Judgment | ○ | ○ | ○ | ○ | X | X | ○ | ○ | ○ |
| | | General judgment | ◎ | ◎ | ◎ | ◎ | X | Δ | ◎ | ◎ | ◎ |
| Test for occurrence of bubbles caused by shock at low temperature (−30° C.) | | | ○ | ○ | ○ | ○ | ○ | ○ | ○ | Δ | X |

| | | | | | | | | | |
|---|---|---|---|---|---|---|---|---|---|
| Structure of $1^{st}$ support | Density | Piece/mm² | 25 | 25 | 25 | 25 | 25 | 25 | |
| | | Multiple | 1 | 1 | 1 | 1 | 1 | 1 | |
| | Area | Diameter (μm) | 12 | 17 | 21 | 24 | 12 | 12 | |
| | | Multiple | 1 | 2 | 3 | 4 | 1 | 1 | |
| Structure of $2^{nd}$ support | Density | Piece/mm² | 125 | 125 | 125 | 125 | 50 | 75 | |
| | | Multiple | 5 | 5 | 5 | 5 | 2 | 3 | |
| | Area | Diameter (μm) | 6 | 6 | 6 | 6 | 6 | 6 | |
| | | Multiple | 0.5 | 0.5 | 0.5 | 0.5 | 0.5 | 0.5 | |
| Ratio of density of support ($2^{nd}/1^{st}$) | | | 2.5 | 1.25 | 0.83 | 0.63 | 1 | 1.5 | |
| Substrate thickness ($1^{st}/2^{nd}$) (mm) | | | | | 0.5/0.1 | | | | |
| Pressure test for examining unevenness in display/Load capacity: kgf(N) | (1) Cylindrical rubber jig | Result (kgf) | 18 | 28 | 40 | 52 | 14 | 15 | |
| | | Result (N) | 176 | 274 | 392 | 510 | 137 | 147 | |
| | | Judgment | ○ | ○ | ○ | ○ | X | ○ | |
| | (2) Cylindrical jig | Result (kgf) | 10 | 18 | 24 | 28 | 9 | 10 | |
| | | Result (N) | 98 | 176 | 235 | 274 | 88 | 98 | |
| | | Judgment | ○ | ○ | ○ | ○ | X | ○ | |
| | (3) Spherical jig | Result (kgf) | 10 | 16 | 18 | 20 | 8 | 8 | |
| | | Result (N) | 98 | 157 | 176 | 196 | 78 | 78 | |
| | | Judgment | ○ | ○ | ○ | ○ | ○ | ○ | |
| | | General judgment | ◎ | ◎ | ◎ | ◎ | Δ | ◎ | |
| Test for occurrence of bubbles caused by shock at low temperature (−30° C.) | | | ○ | ○ | ○ | ○ | ○ | ○ | |

Figure 10:
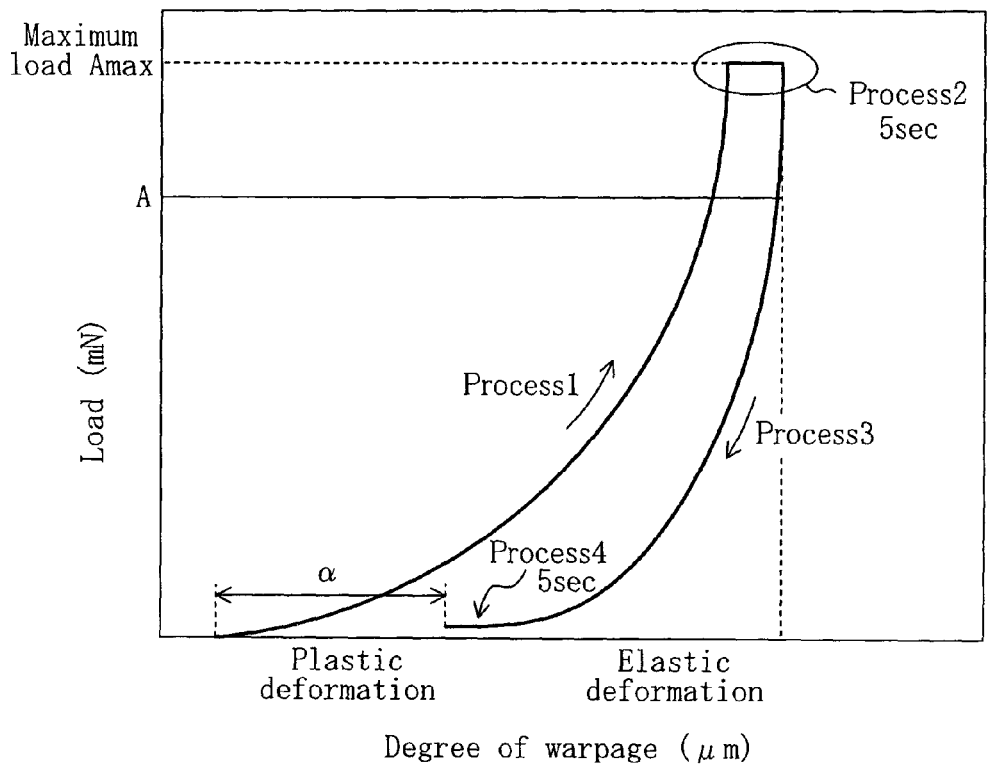
FIG. 10 is a graph illustrating the relationship between a load applied to the substrate and the degree of warpage of the substrate.

(Standard support structure)
$1^{st}$ support; density: 25 pieces/mm², area (diameter): 12 μm
$2^{nd}$ support; density: 25 pieces/mm², area (diameter): 12 μm
(Target value of load capacity in pressure test)
(1) Cylindrical rubber jig: ≧15 kgf (147N),
(2) Cylindrical jig: ≧10 kgf (98N),
(3) Spherical jig: ≧8 kgf (78N)
General judgment . . .
◎: Excellent with 3 jigs,
○: Excellent with 2 of 3 jigs,
Δ: Excellent with 1 of 3 jigs,
X: Poor with all jigs
Test for occurrence of bubbles caused by shock at low temperature)
○: No display failure,
Δ: Some panels caused display failure,
X: All panels caused display failure For explanation of the principle of the occurrence of unevenness in display caused by pressure, FIG. 10 shows a graph illustrating the deformation of the support when a load is applied to the support itself or a local area.

In the first process, the support is pressed at the rate of 1 mm/min. In the second process, the support is kept pressed for 5 seconds at a given maximum load. In the third process, the load is withdrawn at the rate of 1 mm/min. Then, in the fourth process, the deformation of the support was shifted to elastic deformation to plastic deformation (a), i.e., the support was no longer able to return to the original state.

When load A which is below the limit is applied, the degree of plastic deformation (α) is almost 0 even after the load is withdrawn. However, when load Amax exceeding the limit is applied, the support shows plastic deformation (α). Due to the plastic deformation (α) of the support, the thickness of the cell is locally changed. This is considered as a main cause of the unevenness in display caused by pressure.

Table 1 indicates that most of the liquid crystal display devices showed excellent results in the pressure test. In these liquid crystal display devices, substrates not thicker than 0.5 mm were used. Accordingly, it is indicated that excellent effect was obtained on the thin liquid crystal display devices in which the first or the second substrate is at least 0.5 mm or less in thickness. Referring to the results shown in Table 1, display failure was observed in two of the liquid crystal display devices in which the density ratio between the first and second supports, which is determined by [(the density of the second supports×the diameter of the traverse plane of the second supports)/(the density of the first supports×the diameter of the traverse plane of the first supports)], was 1. That is, if the density ratio between the supports is about 1.2 or more, the display device prevents the unevenness in display caused by pressure with high reliability.

FIG. 11 shows the upper limit value of the pressure below which the unevenness in display was not observed. In this examination, the density of the first supports was fixed (25 pieces/mm2, diameter: 12 µm) and the pressure was applied using a rod with a spherical end in view of local deformation. Particularly when the substrate thickness was small, the provision of the second supports in addition to the first supports exhibited significant effect.

Figure 12:
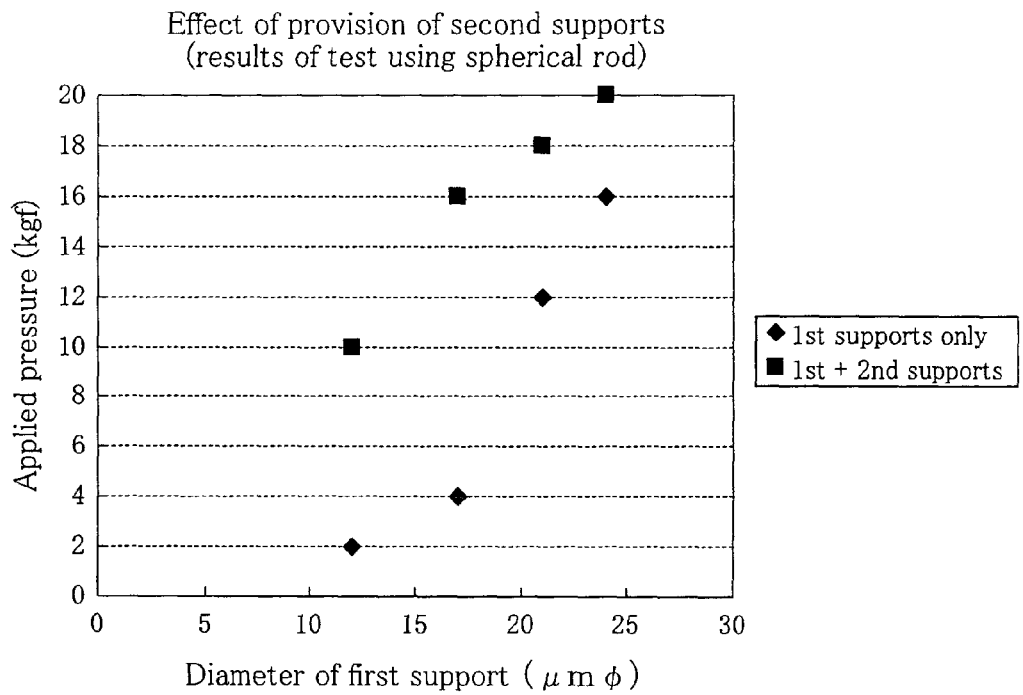
FIG. 12 is a graph illustrating the relationship between the diameter of the first supports and the upper limit value of applied pressure that does not cause unevenness in display when the CF substrate and the TFT substrate are about 0.05 mm and about 0.5 mm in thickness, respectively.
Figure 13:
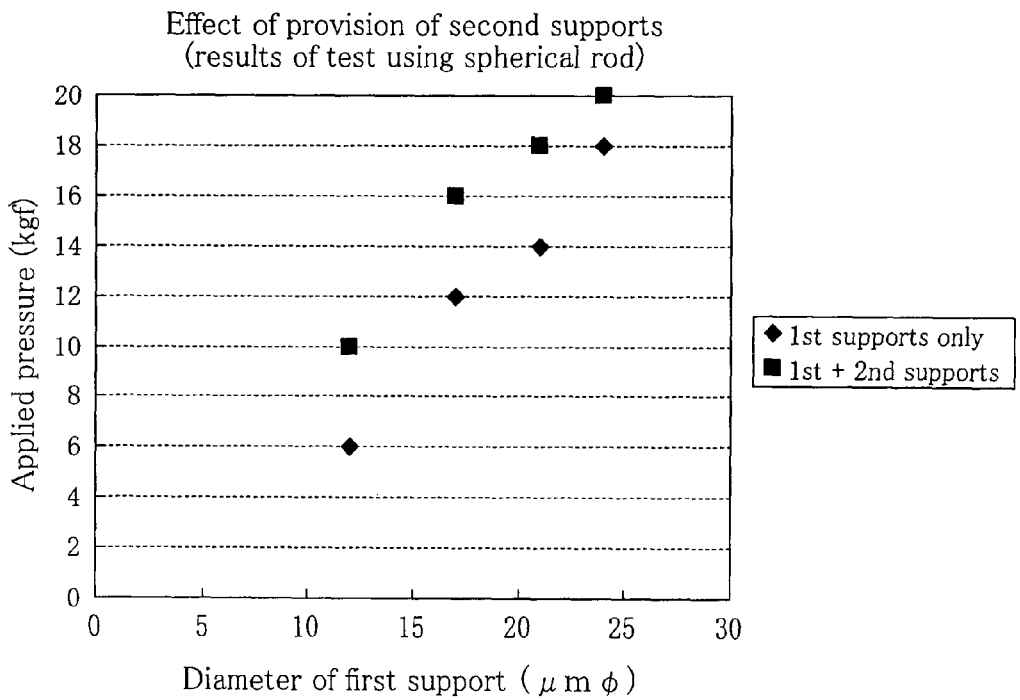
FIG. 13 is a graph illustrating the relationship between the diameter of the first support and the upper limit value of applied pressure that does not cause unevenness in display when the CF substrate and the TFT substrate are about 0.1 mm and about 0.5 mm in thickness, respectively.
Figure 14:
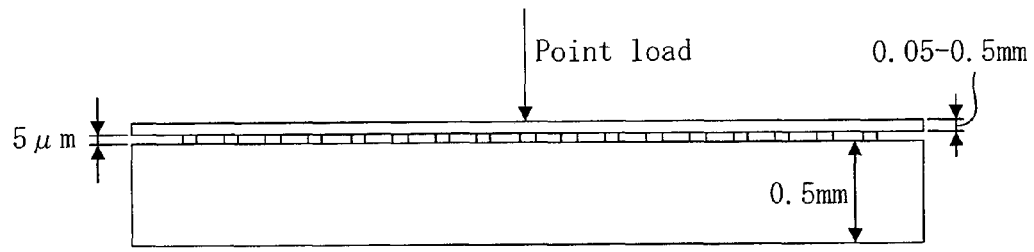
FIG. 14 is a view illustrating how a point load is applied to the substrate surface.
Figure 15:
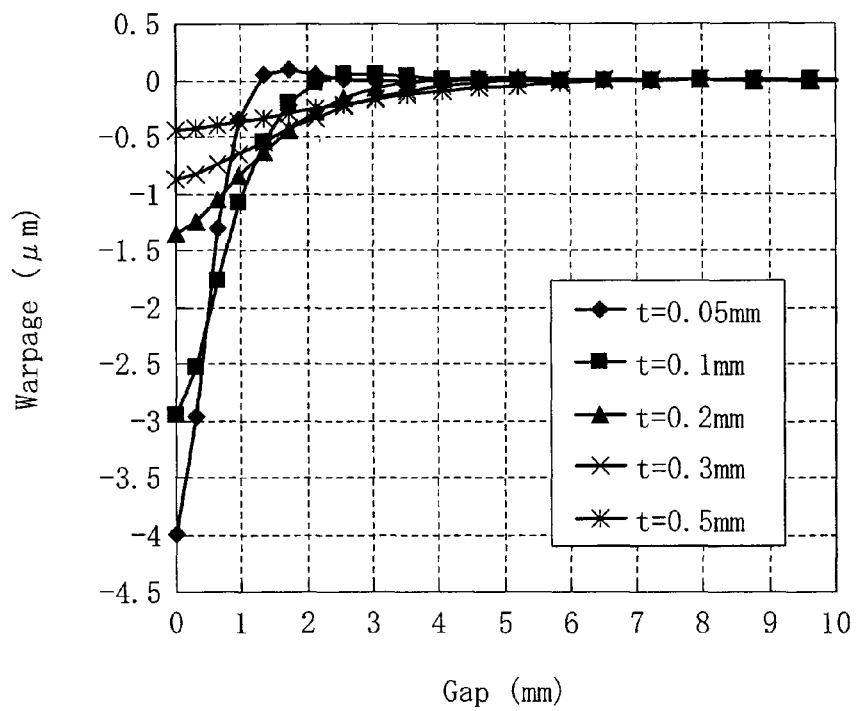
FIG. 15 is a graph illustrating the relationship between the thickness of the substrate that receives a load and the warpage of the substrate when the load is fixed.
Figure 16:
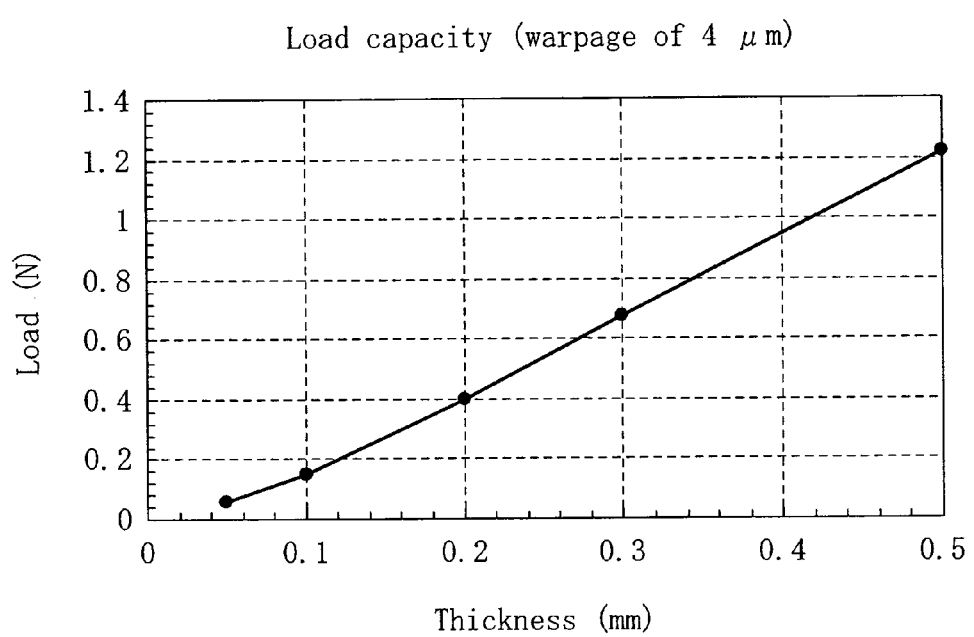
FIG. 16 is a graph illustrating the relationship between a load that warps the substrate by about 4 µm and the thickness of the substrate.

FIGS. 12 and 13 are graphs illustrating the relationship between the diameter of the first supports and the upper limit value of the pressure below which the unevenness in display was not observed. In this examination, the substrates of 0.05/0.5 mm or 0.1/0.5 mm in thickness were used and the pressure was applied using a rod with a spherical end in view of local deformation.

The larger the diameter of the first supports is, i.e., the larger the cross-sectional area is, the more excellent resistance to pressure is exhibited. However, when the supports having a larger diameter are formed by patterning, the effective aperture ratio may possibly be decreased in connection with the width of bus lines (light blocking portions). That is, from the viewpoint of design rule, the diameter of the supports is preferably 20 µm or less in order to provide the supports on the bus lines. If the supports with a larger diameter are provided, it is difficult to prevent leakage of light from the vicinity of the supports and the contrast ratio of the display is greatly reduced. Further, the aperture ratio is also reduced significantly and the transmittance of the panel may possibly be reduced. It is also confirmed that the effective aperture ratio is reduced by about 10% or more when the ratio of the density of the second supports, which is determined by [(the number of the supports/mm2)×the cross-sectional area of the supports] to the density of the first supports is more than 10.

Evaluation Test 2

An evaluation test was performed on liquid crystal display devices configured according to the first preferred embodiment to examine the relationship among the thicknesses of the substrates, the densities of the first and second supports and the occurrence of bubbles caused by shock at low temperature.

Liquid Crystal Display Device for Evaluation

Liquid crystal display devices were prepared each including a combination of a 0.5 mm thick first substrate and a 0.05 mm thick second substrate or a combination of a 0.5 mm first substrate and a 0.1 mm thick second substrate and first and second supports each arranged at a predetermined density (pieces per unit area) and having a predetermined cross-sectional area (diameter). A pair of certain polarizers were bonded to the outer surfaces of the substrates of the liquid crystal display panel.

Evaluation Method

A test was performed on the liquid crystal display devices for evaluation to examine the occurrence of bubbles induced by shock at low temperature.

First, each of the liquid crystal display devices was left stand in a thermostat in an environment of −30° C. for 3 hours. Then, a pachinko ball was free-dropped onto the surface of the CF substrate from a height of 10 cm.

The liquid crystal display device was taken out of the thermostat and visually and microscopically checked as to the presence of unevenness in display due to bubbles and the degree of unevenness, if any, using a panel lighting device.

Evaluation Results

The results of the test for the occurrence of bubbles caused by load application at low temperature are shown in Table 1. Symbol ○ shown in Table 1 indicates that display failure was not observed and Δ indicates that some of the display panels showed display failure.

As shown in Table 1, display failure due to the occurrence of bubbles caused by shock at low temperature was observed in one of the liquid crystal display devices in which the density ratio between the first and second supports [(the density of the second supports×the diameter of the traverse plane of the second supports)/(the density of the first supports×the diameter of the traverse plane of the first supports)] was 1 or less. On the other hand, sufficiently excellent results were exhibited by the liquid crystal display devices in which the density ratio is higher than 1, such as 1.25 closest to 1. Therefore, if the density ratio between the first and second supports is 1.2 or more, the liquid crystal display device shows particularly excellent characteristic of preventing the occurrence of bubbles caused by shock at low temperature.

Evaluation Test 3

The tests for examining the unevenness in display caused by pressure and the occurrence of bubbles caused by shock at low temperature were performed on the liquid crystal display devices for evaluation in the same manner as described above. The gap between the second supports and the counter substrate was varied to examine the influence of the relationship between the gap and the thickness of the liquid crystal layer on the unevenness in display and the occurrence of bubbles.

Liquid Crystal Display Device for Examination

The liquid crystal display devices used were configured to have different gaps between the second supports and the counter substrate.

Test conditions were as follows. The first and second substrates were 0.5/0.05 mm in thickness, respectively. The density and the diameter of the first supports were 25 pieces/mm2 and 17 µm. The density and the diameter of the second supports were 125 pieces/mm2 and 6 µm.

Evaluation Result

Evaluation results are shown in Table 2. According to Table 2, the liquid crystal display devices in which the gap between the second supports and the counter substrate was 0.06 to 0.19 times the thickness of the liquid crystal layer (3.40 µm), as well as those in which the gap was 0.10 to 0.20 times the thickness of the liquid crystal layer (5.10 µm), were judged excellent as to prevention of the display failure caused by pressure and prevention of the occurrence of bubbles caused by shock at low temperature. The results indicate that if the gap between the second supports and the counter substrate is 0.05 or more times and 0.20 or less times the thickness of the liquid crystal layer, the unevenness in display caused by pressure and the occurrence of bubbles caused by shock at low temperature are effectively prevented.

TABLE 2

|  |  |  | \(1\) Thickness of liquid crystal layer (μm) |  | 3.40 |  |  |  | 5.10 |  |  |  |
|---|---|---|---|---|---|---|---|---|---|---|---|---|
| Structure of 2$^{nd}$ support |  | (2) Gap from the counter substrate (μm) | 0.80 | 0.65 | 0.40 | 0.20 | 0.15 | 1.10 | 1.00 | 0.50 | 0.20 |
|  |  | Gap ratio ((2)/(1)) | 0.24 | 0.19 | 0.12 | 0.06 | 0.04 | 0.22 | 0.20 | 0.10 | 0.04 |
| Pressure test for examining unevenness in display/Load capacity: kgf(N) | Cylindrical rubber jig | Result (kgf) | 16 | 19 | 28 | 31 | 32 | 15 | 16 | 25 | 28 |
|  |  | Result (N) | 157 | 186 | 274 | 304 | 314 | 147 | 157 | 245 | 274 |
|  |  | Judgment | ○ | ○ | ○ | ○ | ○ | ○ | ○ | ○ | ○ |
|  | Cylindrical jig | Result (kgf) | 9 | 10 | 16 | 18 | 20 | 9 | 12 | 17 | 19 |
|  |  | Result (N) | 88 | 98 | 157 | 176 | 196 | 88 | 118 | 167 | 186 |
|  |  | Judgment | X | ○ | ○ | ○ | ○ | X | ○ | ○ | ○ |
|  | Spherical jig | Result (kgf) | 7 | 8 | 16 | 18 | 19 | 6 | 10 | 14 | 16 |
|  |  | Result (N) | 69 | 78 | 157 | 176 | 186 | 59 | 98 | 137 | 157 |
|  |  | Judgment | X | ○ | ○ | ○ | ○ | X | ○ | ○ | ○ |
|  |  | General judgment | Δ | ◎ | ◎ | ◎ | ◎ | Δ | ◎ | ◎ | ◎ |
| Test for occurrence of bubbles caused by shock at low temperature (−30° C.) |  |  | ○ | ○ | ○ | ○ | X | ○ | ○ | ○ | Δ |

(Pressure test for examining unevenness in display) Target value . . .
Cylindrical rubber jig: ≧15 kgf (147N),
Cylindrical jig: ≧10 kgf (98N),
Spherical jig: ≧8 kgf (78N)
General judgment . . .
◎: Excellent with 3 jigs,
○: Excellent with 2 of 3 jigs,
Δ: Excellent with 1 of 3 jigs,
X: Poor with all jigs
(Test for occurrence of bubble by shock at low temperature)
○: No display failure,
Δ: Some panels caused display failure,
X: All panels caused display failure
Test conditions . . .
1$^{st}$/2$^{nd}$ substrate thickness: 0.5/0.05 (mm),
1$^{st}$ support: 25 pieces/mm$^2$, 17 μm in diameter,
2$^{nd}$ support: 125 pieces/mm$^2$, 6 μm in diameter Evaluation Test 4

In order to prevent the occurrence of local stains caused by pressure (display failure) and the occurrence of bubbles caused by shock at low temperature that have been unsolved problems involved in the liquid crystal display device having a thinned substrate, it is also effective to optimize the structure and density of the first supports (cross-sectional shape and area) for controlling the gap between the substrates. Accordingly, a test was performed on liquid crystal display devices including the first supports only to examine the relationship of the density of the first supports and the unevenness in display caused by pressure and the occurrence of bubbles caused by shock at low temperature.

Evaluation Method

Liquid crystal display panels were prepared while the thickness of the thinned substrate was varied in the range of 0.5 mm to 0.05 mm and the density and cross-sectional area of the supports were varied. After certain phase different polarizers were bonded to both surfaces of the panel, a test for examining the unevenness in display caused by pressure and a test for examining the occurrence of bubbles caused by shock at −30° C. were carried out in the same manner as examination tests 1 and 2. Five liquid crystal display panels were subjected to each of the tests.

Evaluation Results

Table 3 shows the results. The results indicate that the optimization of the single kind of supports (the supports for keeping the gap between the substrates) makes it possible to solve the problem of panel strength to a certain degree. In this regard, the above-described problem seems to be solved to a certain degree by optimizing the density and cross-sectional area of the supports.

TABLE 3

| Structure of support | Density |  Piece/mm$^2$ | 25 | 50 | 75 | 150 | 25 | 25 | 25 | 25 | 50 | 75 |
|---|---|---|---|---|---|---|---|---|---|---|---|---|
|  |  | Multiple | 1 | 2 | 3 | 6 | 1 | 1 | 1 | 1 | 2 | 3 |
|  | Area | Diameter (μm) | 12 | 12 | 12 | 12 | 17 | 21 | 24 | 12 | 12 | 12 |
|  |  | Multiple | 1 | 1 | 1 | 1 | 2 | 3 | 4 | 1 | 1 | 1 |
| Substrate thickness (1$^{st}$/2$^{nd}$) (mm) |  |  |  |  |  | 0.5/0.05 |  |  |  |  | 0.5/0.1 |  |
| Pressure test for examining unevenness in display/Load capacity: kgf(N) | (1) Cylindrical rubber jig | Result (kgf) | 10 | 16 | 24 | 42 | 16 | 28 | 36 | 10 | 16 | 28 |
|  |  | Result (N) | 98 | 157 | 235 | 412 | 157 | 274 | 353 | 98 | 157 | 274 |
|  |  | Judgment | X | ○ | ○ | ○ | ○ | ○ | ○ | X | ○ | ○ |
|  | (2) Cylindrical jig | Result (kgf) | 2 | 4 | 8 | 16 | 4 | 14 | 20 | 6 | 6 | 12 |
|  |  | Result (N) | 20 | 39 | 78 | 157 | 39 | 137 | 196 | 59 | 59 | 118 |
|  |  | Judgment | X | X | X | ○ | X | ○ | ○ | X | X | ○ |
|  | (3) Sperical jig | Result (kgf) | 2 | 2 | 4 | 10 | 4 | 12 | 16 | 6 | 6 | 10 |
|  |  | Result (N) | 20 | 20 | 39 | 98 | 39 | 118 | 157 | 59 | 59 | 98 |
|  |  | Judgment | X | X | X | ○ | X | ○ | ○ | X | X | ○ |
|  |  | General judgment | X | X | X | ○ | X | ○ | ○ | X | X | ○ |
| Test for occurrence of bubbles caused by shock at low temperature (−30° C.) |  |  | ○ | Δ | X | X | ○ | X | X | ○ | Δ | X |

TABLE 3-continued

| | | | | | | | | | | |
|---|---|---|---|---|---|---|---|---|---|---|
| Structure of support | Density | Piece/mm² | 150 | 25 | 25 | 25 | 25 | 25 | 25 |
| | | Multiple | 6 | 1 | 1 | 1 | 1 | 1 | 1 |
| | Area | Diameter (μm) | 12 | 17 | 21 | 24 | 12 | 12 | 12 |
| | | Multiple | 1 | 2 | 3 | 4 | 1 | 1 | 1 |
| Substrate thickness ($1^{st}/2^{nd}$) (mm) | | | | 0.5/0.1 | | | 0.5/0.15 | 0.5/0.2 | 0.5/0.5 |
| Pressure test for examining unevenness in display/ | (1) Cylindrical rubber jig | Result (kgf) | 45 | 18 | 30 | 40 | 12 | 12 | 16 |
| | | Result (N) | 441 | 176 | 294 | 392 | 118 | 118 | 157 |
| | | Judgment | ○ | ○ | ○ | ○ | X | X | ○ |
| | (2) Cylindrical jig | Result (kgf) | 20 | 12 | 14 | 24 | 6 | 8 | 10 |
| | | Result (N) | 196 | 118 | 137 | 235 | 59 | 78 | 98 |
| | | Judgment | ○ | ○ | ○ | ○ | X | X | ○ |
| Load capacity: kgf(N) | (3) Sperical jig | Result (kgf) | 14 | 12 | 14 | 18 | 6 | 8 | 8 |
| | | Result (N) | 137 | 118 | 137 | 176 | 59 | 78 | 78 |
| | | Judgment | ○ | ○ | ○ | ○ | X | ○ | ○ |
| | | General judgment | ○ | ○ | ○ | ○ | X | X | ○ |
| Test for occurrence of bubbles caused by shock at low temperature (−30° C.) | | | X | Δ | X | X | ○ | ○ | ○ |

With the use of the single kind of the supports only, however, it is difficult to thin down the panel or increase the strength to a further degree. In order to thin down the panel to a further degree, it is effective to apply the technique disclosed by preferred embodiments of the present invention.

Effects and Advantages

The effects and advantages of various preferred embodiments of the present invention will be explained below.

The liquid crystal display device 10 or 60 according to the first or second preferred embodiments preferably includes the TFT substrate 20 or 70 and the CF substrate 30 or 80 arranged to face each other and the liquid crystal layer 40 or 90 sandwiched therebetween, wherein a plurality of first supports 50 or 100 are provided to extend from one of the TFT substrate 20 or 70 and the CF substrate 30 or 80 to reach the other substrate and a plurality of second supports 51 or 101, which are shorter than the first supports 50 or 100, are arranged to extend from one of the TFT substrate 20 or 70 and the CF substrate 30 or 80 to the other substrate.

With this configuration, a load generally applied to the substrate is received by the first supports 50 or 100 and the second supports 51 or 101. With the provision of the second supports 51 or 101 that are shorter than the first supports 50 or 100, the TFT substrate 20 or 70 and the CF substrate 30 or 80 relatively move to follow the displacement of the liquid crystal layer 40 or 90. Accordingly, the occurrence of bubbles caused by shock at low temperature is prevented.

According to the liquid crystal display device 10 or 60 of preferred embodiments of the present invention, the number of the second supports 51 or 101 may be larger than the number of the first supports 50 or 100.

With this configuration, the number of the first supports 50 or 100 is minimized and the number of the second supports 51 or 101 shorter than the first supports is increased. As a result, when a local load is applied, the TFT substrate 20 or 70 and the CF substrate 30 or 80 follow the displacement of the liquid crystal layer 40 or 90 with more flexibility. Therefore, the local occurrence of bubbles caused by shock at low temperature, which has been frequent in such a case, is prevented with high reliability.

According to the liquid crystal display device 10 or 60 of preferred embodiments of the present invention, the second supports 51 or 101 may be provided in a display region.

If the second supports 51 or 101 are provided in the display region, local display failure in the display region is prevented.

According to the liquid crystal display device 10 or 60 of preferred embodiments of the present invention, the number of the second supports 51 or 101 provided in a pixel pattern 49 or 85 of the display region may be larger than the number of the first supports 50 or 100 in the same pixel pattern.

If the number of the second supports 51 or 101 is larger than the number of the first supports 50 or 100 in the pixel pattern 49 or 85 of the display region, local display failure in the display region is prevented with high reliability.

According to the liquid crystal display device 10 or 60 of preferred embodiments of the present invention, the density of the second supports 51 or 101 may be about 1.2 or more times the density of the first supports 50 or 100 in the pixel pattern 49 or 85.

The second supports 51 or 101 according to preferred embodiments of the present invention are adapted to prevent the occurrence of bubbles caused by shock at low temperature and contribute to reduce the unevenness in display caused by pressure applied to the surface of the thinned substrate. From this point of view, the density of the second supports 51 or 101, which is determined by [(the number of the supports/mm2)×the cross-sectional area of the supports], is preferably higher than that of the first supports 50 or 100. If the density of the second supports is about 1.2 or more times the density of the first supports, the effect of the second supports is exhibited more significantly.

According to the liquid crystal display device 10 or 60 of preferred embodiments of the present invention, the second supports 51 or 101 may be arranged in the same pattern in each of the pixel patterns 49 or 85.

With this configuration, the second supports 51 or 101 arranged in the uniform pattern equally receive the load applied locally to the substrate. As a result, the local substrate warpage is effectively prevented and the display function of the liquid crystal display device 10 or 60 is made very stable and greatly improved.

According to the liquid crystal display device 10 or 60 of preferred embodiments of the present invention, a gap between the second supports 51 or 101 and the TFT substrate 20 or 70 preferably is about 0.05 or more times and about 0.2 or less times the thickness of the liquid crystal layer 40 or 90.

If the gap between the second supports 51 or 101 and the TFT substrate 20 or 70 is about 0.2 or less times the thickness of the liquid crystal layer 40 or 90, the thin liquid crystal display device effectively prevents the unevenness in display caused by pressure applied to the liquid crystal display panel. Further, if the gap between the second supports 51 or 101 and the TFT substrate 20 or 70 is about 0.05 or more times the thickness of the liquid crystal layer 40 or 90, the occurrence of bubbles caused by shock at low temperature and the occurrence of failed domains are prevented with high efficiency.

According to the liquid crystal display device 10 or 60 of preferred embodiments of the present invention, at least one of the TFT substrate 20 or 70 and the CF substrate 30 or 80 may have a thickness of about 0.5 mm or less.

With this configuration, in the case where the glass substrates have to be thinned down to reduce the thickness or weight of the panel of the liquid crystal display device 10 or 60, the TFT substrate 20 or 70 and the CF substrate 30 or 80 may be equally thinned down or designed to have different thicknesses.

According to the liquid crystal display device 10 or 60 of preferred embodiments of the present invention, the TFT substrate 20 or 70 and the CF substrate 30 or 80 may have different thicknesses.

With this configuration, the first and second substrates, i.e., the TFT substrate 20 or 70 and the CF substrate 30 or 80, are relatively thinned down. This makes it possible to prevent the TFT substrate 20 or 70 whose thickness has been reduced smaller than the predetermined level from breaking upon local application of heat or pressure to the periphery of the substrate in the process of directly mounting connection terminals and drivers on the TFT substrate 20 or 70. Further, in the process of forming thin multilayers such as TFT terminals and wires, the TFT substrate 20 or 70 is affected or warped by change in temperature or pressure. Even in such a case, the reduction of mechanical strength of the thinned TFT substrate 20 or 70 is prevented.

According to the liquid crystal display device 10 of preferred embodiments of the present invention, each of the pixel patterns 49 may include a light transmissive region 26 and a light reflective region 22.

With this configuration, the first and second supports 51 or 101 are simultaneously formed in the light transmissive region 26 and the light reflective region higher than the other region by the thickness of a reflective layer 23. That is, the first and second supports 51 or 101 having different heights are efficiently provided. Therefore, production efficiency of the device is improved.

According to the liquid crystal display device 10 or 60 of preferred embodiments of the present invention, the second supports 51 or 101 may be provided in a light blocking region of the display region.

If the second supports 51 or 101 are provided in the light blocking region of the display region, leakage of light at the places of the second support 51 or 101 is prevented. Further, in the liquid crystal display device 10, if the second supports are provided in the light blocking region in the light reflective region 22 of the pixel, such as a storage capacitor line, the reduction of effective aperture ratio is prevented.

According to the liquid crystal display device 10 or 60 of preferred embodiments of the present invention, the first supports 50 or 100 and the second supports 51 or 101 may have different cross-sectional areas.

In general, the larger the cross-sectional area of the support (an area of a cross section taken in the direction perpendicular to the direction of extension of the support) is, the higher resistance to pressure the glass substrate is likely to have. The supports prevent leakage of light if they are formed at certain positions on the lines. On the other hand, if the supports are designed to have a larger cross-sectional area than the certain level, the display characteristic such as contrast ratio is adversely affected. In particular, in the case of preferred embodiments of the present invention where a larger number of the second supports 51 or 101 than the first supports are provided, the first supports 50 or 100 and the second supports 51 or 101 having different cross-sectional areas are arranged in asymmetric patterns. Therefore, reduction of the aperture ratio and the contrast ratio of the panel is effectively prevented. The first supports 50 or 100 and the second supports 51 or 101 may be made of the same or different materials in the different processes. However, it is more effective to form the first supports 50 or 100 and the second supports 51 or 101 at one time by the same photolithography and patterning from the viewpoints of reduction of production process and cost. In this way, the first and second supports may be formed at one time to have different heights and different cross-sectional areas.

According to the liquid crystal display device 10 or 60 of preferred embodiments of the present invention, the cross-sectional area of the second supports 51 or 101 may be smaller than the cross-sectional area of the first supports 50 or 100.

If the cross-sectional area of the second supports 51 or 101 to be formed at certain positions and certain density with respect to the first supports is designed to be smaller than the cross-sectional area of the first supports 50 or 100, the second supports are provided by the steps of the same number as the conventional steps of providing the first supports 50 or 100 for keeping the gap between the substrates.

According to the liquid crystal display device 10 of preferred embodiments of the present invention, vertical alignment films 25 and 33 for vertically aligning liquid crystal molecules when no voltage is applied may be provided on the surfaces of the TFT substrate 20 and the CF substrate 30 facing the liquid crystal layer 40 and alignment controllers 52 for radially aligning the liquid crystal molecules when a voltage is applied may be provided on at least one of the surfaces of the TFT substrate 20 or 70 and the CF substrate 30 or 80 facing the liquid crystal layer 40 or 90.

With this configuration, in the liquid crystal layer 40 sandwiched between the substrates that are less likely to cause local warpage, the vertical alignment under no application of load and the radial alignment under application of load are not disturbed even if a local load is applied. Therefore, excellent display quality is maintained.

According to the liquid crystal display device 10 of preferred embodiments of the present invention, the second supports 51 may also function as the alignment controllers.

If the second supports 51 also function as the alignment controllers, the required number of the second supports 51 is reduced. Therefore, the production efficiency of the device is improved.

According to the liquid crystal display device 60 of preferred embodiments of the present invention, an alignment film 75 or 87 subjected to a certain alignment treatment may be provided on at least one of the surfaces of the TFT substrate 70 and the CF substrate 80 facing the liquid crystal layer 90.

With this configuration, in the liquid crystal layer sandwiched between the substrates less likely to cause local warpage, the alignment given by the certain alignment treatment is not disturbed even if a local load is applied. Therefore, excellent display quality is maintained.

As described above, various preferred embodiments of the present invention are useful for liquid crystal display devices.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A liquid crystal display device comprising:
a TFT array substrate including a glass substrate;
a color filter substrate which includes a glass substrate, and is arranged to face the TFT array substrate;
a liquid crystal layer provided between the TFT array substrate and the color filter substrate;
first supports which are arranged between the TFT array substrate and the color filter substrate to correspond to light blocking regions; and
second supports which are shorter than the first supports, and are arranged on the color filter substrate, wherein
a cross sectional area of the first support is larger than a cross sectional area of the second support; and
a gap between the second supports and the TFT array substrate is about 0.06 or more times and about 0.2 or less times a thickness of the liquid crystal layer.

2. The liquid crystal display device of claim 1, wherein the number of the second supports is larger than the number of the first supports in each of unit pixel areas constituting a display region.

3. The liquid crystal display device of claim 1, wherein the first support is arranged adjacent to a blue pixel in each of unit pixel areas constituting a display region.

4. The liquid crystal display device of claim 1, wherein a density of the second supports in a display region is 1.2 or more times a density of the first supports in the display region.

5. The liquid crystal display device of claim 1, wherein the second supports are arranged to correspond to the light blocking regions.

6. The liquid crystal display device of claim 1, wherein the light blocking regions constitute a black matrix which divides unit pixel areas constituting a display region.

7. The liquid crystal display device of claim 1, wherein the first supports are provided on the color filter substrate to extend from the color filter substrate to reach the TFT array substrate.

8. The liquid crystal display device of claim 1, wherein the glass substrate of the TFT array substrate and the glass substrate of the color filter substrate have different thicknesses.

9. The liquid crystal display device of claim 8, wherein the glass substrate of the color filter substrate is thinner than the glass substrate of the TFT array substrate.

10. The liquid crystal display device of claim 1, wherein at least one of the glass substrate of the color filter substrate or the glass substrate of the TFT array substrate has a thickness of 0.5 mm or less.

11. The liquid crystal display device of claim 2, wherein the second supports are arranged around the first support in each of the unit pixel areas constituting the display region.

12. A liquid crystal display device comprising:
a first substrate and a second substrate arranged to face each other;
a liquid crystal layer sandwiched between the first substrate and the second substrate;
first supports which are arranged to extend from one of the first substrate and the second substrate to the other of the first substrate and the second substrate; and
second supports which are arranged to extend from one of the first substrate and the second substrate to the other substrate, and are shorter than the first supports; wherein
a gap between the second supports and the other substrate facing the second supports is about 0.06 or more times and about 0.2 or less times a thickness of the liquid crystal layer.

13. The liquid crystal display device of claim 12, wherein the second supports are arranged around the first supports in such a manner that the first supports are adjacent to the second supports only.

* * * * *